W. ROBERTS, Jr.
Rock-Drills.

No. 145,364.  Patented Dec. 9, 1873.

WITNESSES:
E. Wolff
C. Sedgwick

INVENTOR:
W. Roberts Jr.
BY
ATTORNEYS.

UNITED STATES PATENT OFFICE.

WILLIAM ROBERTS, JR., OF COPPER FALLS, MICHIGAN.

IMPROVEMENT IN ROCK-DRILLS.

Specification forming part of Letters Patent No. 145,364, dated December 9, 1873; application filed October 18, 1873.

*To all whom it may concern:*

Be it known that I, WILLIAM ROBERTS, Jr., of Copper Falls, in the county of Keweenaw and State of Michigan, have invented a new and useful Improvement in Drill-Chuck, of which the following is a specification:

My invention consists in fastening drills in a solid chuck, stock, or head by a couple of half-boxes and tapered bolts, the said half-boxes having the shank of the drill between them, and entering the socket of the stock, and the bolts passing through the stock on opposite sides, and bearing against the back of the boxes in grooves, so as to wedge them tight against the shanks of the drill, and hold it in the boxes, and also hold the boxes from working out by the notches in the back.

Figure 1:
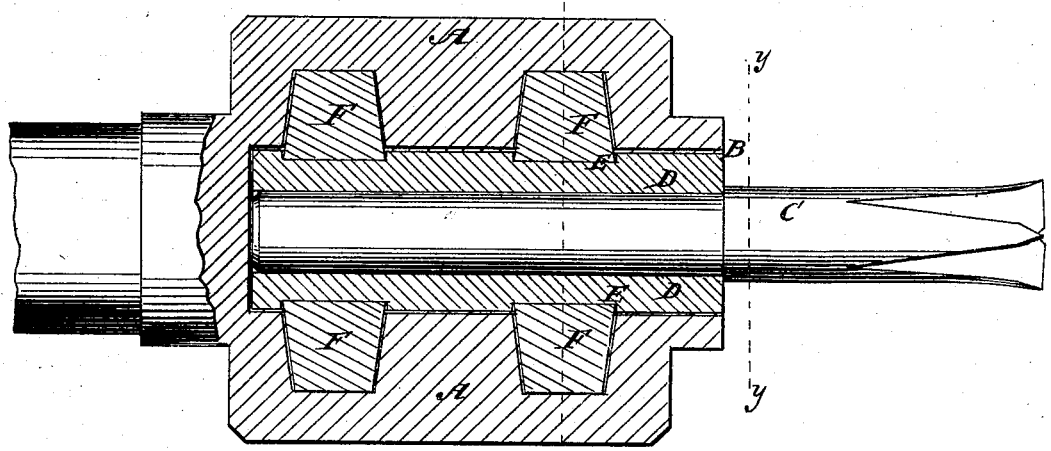
Figure 2:
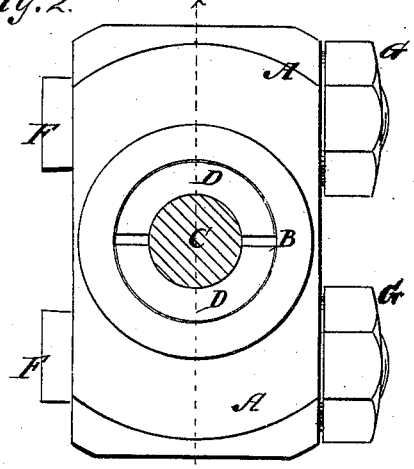
Figure 3:
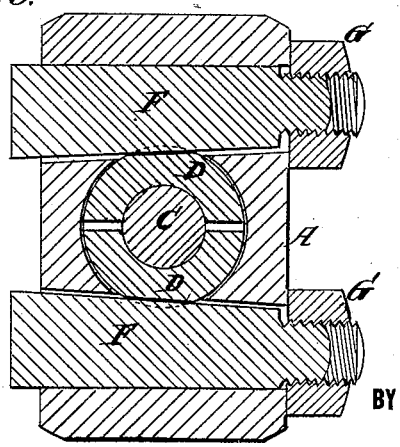

Figure 1 is a longitudinal sectional elevation of a drill-chuck with a drill fastened in it according to my improvement, the section being taken on the line $x$ $x$, Fig. 2. Fig. 2 is a cross-section on the line $y$ $y$, Fig. 1; and Fig. 3 is a cross-section on the line $z$ $z$, Fig. 1.

A is the solid head or stock, which has a socket, B, (preferably round,) for receiving the drill C and the half-boxes D. These boxes fit in the socket B loosely, and receive the shank of the drill in cavities formed in them. They are constructed in circular form if the socket is circular; but they may be flat-sided in case the socket is so formed. On the back they have transverse notches or grooves E. F represents the bolts for fastening the boxes. They pass through the head A in tapered holes, traversing it at the back of the boxes, and are tapered on the sides bearing against the box, and have a nut, G, key, or other equivalent device at the small end, for drawing them hard against the boxes. The holes for the bolts, also the bolts, are so shaped in cross-section that they cannot be put in the holes, except with the tapered side against the box.

By the notches in the boxes receiving the bolts, said boxes are effectually prevented from working out, and the boxes clamp the drill-shank with sufficient force to hold it securely.

By shifting the bolts of the opposite sides rightly, the drill can be readily adjusted to the center of the socket exactly.

Having thus described my invention, I claim as new and desire to secure by Letters Patent—

The combination of the socketed solid head A, half-boxes D, bolts F, and nuts G, substantially as specified.

WM. ROBERTS, JR.

Witnesses:
    FRED. SMITH,
    J. H. MOYLE.